United States Patent
Dillaway et al.

(10) Patent No.: US 7,543,140 B2
(45) Date of Patent: Jun. 2, 2009

(54) REVOCATION OF A CERTIFICATE AND EXCLUSION OF OTHER PRINCIPALS IN A DIGITAL RIGHTS MANAGEMENT (DRM) SYSTEM BASED ON A REVOCATION LIST FROM A DELEGATED REVOCATION AUTHORITY

(75) Inventors: Blair Brewster Dillaway, Clyde Hill, WA (US); Philip Lafornara, Bellevue, WA (US); Brian A. LaMacchia, Seattle, WA (US); Rushmi U. Malaviarachchi, Bellevue, WA (US); John L. Manferdelli, Redmond, WA (US); Charles F. Rose, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 10/374,312

(22) Filed: Feb. 26, 2003

(65) Prior Publication Data

US 2004/0168056 A1    Aug. 26, 2004

(51) Int. Cl.
*H04L 29/00* (2006.01)

(52) U.S. Cl. .................. 713/156; 713/157; 713/158; 713/173; 713/175

(58) Field of Classification Search .............. 713/156, 713/157, 158, 173, 175
See application file for complete search history.

(56) References Cited

U.S. PATENT DOCUMENTS 5,659,616 A * 8/1997 Sudia ..................... 705/76
5,666,416 A    9/1997 Micali .................... 380/23
5,699,431 A * 12/1997 Van Oorschot et al. ...... 380/30
6,128,738 A * 10/2000 Doyle et al. ............... 713/185
6,138,235 A * 10/2000 Lipkin et al. .............. 713/155
6,209,091 B1 * 3/2001 Sudia et al. ............... 713/175
6,226,743 B1 * 5/2001 Naor et al. ................ 713/177
6,233,341 B1 * 5/2001 Riggins ................... 380/277
6,256,741 B1    7/2001 Stubblebine .............. 713/201
6,490,358 B1 * 12/2002 Geer et al. ................ 380/286
6,513,117 B2 * 1/2003 Tarpenning et al. ......... 713/156
6,990,583 B2 * 1/2006 Matsuyama et al. ......... 713/175
7,047,404 B1 * 5/2006 Doonan et al. ............. 713/156
7,050,589 B2 * 5/2006 Kwan ...................... 380/286
7,073,195 B2 * 7/2006 Brickell et al. ............ 726/5

(Continued)

OTHER PUBLICATIONS

Firozabadi, B.S.; Sergot, M.; "Revocation schemes for delegated authorities"; IEEE Jun. 5-7, 2002; pp. 210-213.*

(Continued)

*Primary Examiner*—Carl Colin
(74) *Attorney, Agent, or Firm*—Woodcock Washburn LLP

(57) ABSTRACT

A digital certificate identifies an entity as having authority over the certificate to revoke same as delegated by the issuer. The certificate also has at least one revocation condition relating to possible revocation of the certificate. To authenticate the certificate, the identification of the delegated revocation authority, a location from which a revocation list is to be obtained, and any freshness requirement to be applied to the revocation list are determined from the certificate. It is then ensured that the revocation list from the location is present and that the present revocation list satisfies the freshness requirement, that the revocation list is promulgated by the delegated revocation authority identified in the certificate, and that the certificate is not identified in the revocation list as being revoked.

20 Claims, 5 Drawing Sheets

U.S. PATENT DOCUMENTS

| | | | | |
|---|---|---|---|---|
| RE39,360 | E * | 10/2006 | Aziz et al. | 713/150 |
| 7,143,025 | B2 * | 11/2006 | Walsh et al. | 703/21 |
| 7,152,048 | B1 * | 12/2006 | Johnson | 705/76 |
| 7,308,573 | B2 * | 12/2007 | Kostal et al. | 713/156 |
| 2001/0005841 | A1 * | 6/2001 | Wray | 705/76 |
| 2002/0099822 | A1 * | 7/2002 | Rubin et al. | 709/225 |
| 2003/0037234 | A1 * | 2/2003 | Fu et al. | 713/158 |
| 2003/0196085 | A1 * | 10/2003 | Lampson et al. | 713/156 |

OTHER PUBLICATIONS

Bandmann, O.; Dam, M.; Firozabadi, B.S.; "Constrained delegation"; IEEE 2002; pp. 131-140.*

Saito, T.; Umesawa, K.; Okuno, H.G.; "Privacy-enhanced access control by SPKI and its application to Web server"; IEEE Jun. 14-16, 2000; pp. 201-206.*

R. Housley, W. Ford, W. Polk, D. Solo; "Internet X.509 Public Key Infrastructure Certificate and CRL Profile"; Network Working Group Request for Comments: 2459; Jan. 1999; 130 Pages.*

R. Housley, P. Hoffman; "Internet X.509 Public Key Infrastructure Operational Protocols: FTP and HTTP"; Network Working Group Request for Comments: 2585; May 1999; pp. 1-4.*

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Griswold, G.N. "A Method for Protecting Copyright on Networks", *IMA Intell. Property Project Proceedinsg*, Jan. 1994, 1(1), 169-178.

Gunter, C.A., et al. "Models and Languages for Digital Rights", *Proceedings of the 34th Annual Hawaii International Conference on System Sciences*, 2001, 5.

Kahn, R.E. "Deposit, Registration and Recordation in an Electronic Copyright Management System", *IMA Intellectual Property Project Proceedings*, Jan. 1994, 1(1), 111-120.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Lampson, B. et al., "Authentication in Distributed Systems: Theory and Practice", *ACM Transactions on Computer Systems*, 1992, 10(4), 265-310.

International Telecommunication Union, ITU-T Telecommunication Standardization Sector of ITU, Series X: Data Networks and Open System Communications, Mar. 2003, XP-002284035.

* cited by examiner

REVOCATION OF A CERTIFICATE AND EXCLUSION OF OTHER PRINCIPALS IN A DIGITAL RIGHTS MANAGEMENT (DRM) SYSTEM BASED ON A REVOCATION LIST FROM A DELEGATED REVOCATION AUTHORITY

CROSS-REFERENCE TO RELATED APPLICATIONS

The following U.S. Patent Applications disclose subject matter that is related to the subject matter of the present application, and are hereby incorporated herein by reference in their entirety:

U.S. patent application Ser. No. 10/185,527, filed Jun. 28, 2002, now U.S. Pat. No. 7,353,402, and entitled "Obtaining a Signed Rights Label (SRL) for Digital Content and Obtaining a Digital License Corresponding to the Content Based on the SRL in a Digital Rights Management System", U.S. patent application Ser. No. 10/185,278, filed Jun. 28, 2002 and entitled "Using a Rights Template to Obtain a Signed Rights Label (SRL) for Digital Content in a Digital Rights Management System"; and U.S. patent application Ser. No. 10/185,511, filed Jun. 28, 2002 and entitled "Systems And Methods For Issuing Usage Licenses For Digital Content And Services";

TECHNICAL FIELD

The present invention relates to a system such as a digital rights management (DRM) system for enforcing rights in digital content. More specifically, the present invention relates to such an enforcement system that allows access to encrypted digital content on a computing device only in accordance with parameters specified by license rights acquired by a user of the digital content. Even more specifically, the present invention relates to providing a mechanism to indicate to the DRM enforcement system that any particular digital certificate or other principal in the DRM system is-no longer trustworthy."

BACKGROUND OF THE INVENTION

As is known, and referring now to FIG. 1, a digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' or otherwise accesses the digital content with the aid of an appropriate rendering device or the like such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14 and also during usage of such content 12. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device, and is signed by the license issuer. Because the content 12 requires the license 16 for access thereto, then, the content 12 may be freely distributed. Significantly, the license 16 must somehow be bound either directly or indirectly to a computing device 14 on which the content 12 is to be rendered. Otherwise, the license 16 could potentially be copied to an infinite number of other devices 14 to render the corresponding content 12 thereon, also.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise. Of necessity, the trusted component 18 has knowledge of the external entities trusted to issue licenses and can certify the identity of various entities such as the external entities, users, applications, and machines.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of uses, plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 16 and is applied to (KD(CONTENT)) from the content package 13 to result in the actual content 12, and the actual content 12 is then in fact rendered. The trusted component 18 may also need to verify and track dynamic aspects of the environment of the computing device 14 such as the application doing the content rendering.

Typically, to perform cryptographic functions in the connection with the trusted component 18, including the aforementioned applying of (KD) to (KD(content)) and all other cryptographic functions, the trusted component 18 has a black box 22. As with the license evaluator 20, the black box 22 is trusted in the DRM system 10 to carry out the wishes of the owner of the digital content 12 according to the rules and requirements in the license 16, and the user should not 0O be able to easily alter such trusted element for any purpose, nefarious or otherwise. It is also the job of the black box 22 to act as a license enforcer, and in particular to insure that content 12 is only decrypted and delivered to appropriate rendering code in the user's computing device 14.

Typically, the black box 22 can be expected to perform both symmetric (single key) and asymmetric (public-private key pair) cryptographic encryption and/or decryption. In particular, the aforementioned decryption key (KD) is typically a symmetric key and is therefore transmitted in an encrypted form by being encrypted by another symmetric key or a public key or private key. Thus, to decrypt (KD(content)), and if for example it is the case that (KD) is encrypted by a public key (PU) (i.e., (PU(KD))), the black box 22 must first obtain the private key (PR) corresponding to (PU) and asymmetrically apply (PR) to (PU(KD)) to result in (KD), and then must symmetrically apply (KD) to (KD(content)) to result in the content.

The black box 22 is provided with a secret and is entrusted to not reveal the secret to anybody or anything. Thus, the secret is the basis for encrypting the content key (KD), either directly or indirectly, and only the black box 22 as the bearer of the secret can decrypt the content key (KD). Thus, the license 16 having (KD) encrypted in a manner related to the secret is tied or bound to the black box 22 thereby. Typically, the secret is the private key (PR-BB) of a key pair (PU-BB, PR-BB) that is unique or nearly unique to the black box 22, and the corresponding public key (PU-BB) of the black box 22 is employed to encrypt (KD), either directly or indirectly. Of paramount importance, the black box 22 must be able to hide (PR-BB) and protect same and related cryptographic code from observation and tampering, and (PR-BB) and such code are therefore embedded or encapsulated in the black box 22, with appropriate obfuscation and self-protection.

In order to prevent unrestricted duplication, the black box 22 is tied to one particular hardware machine. Typically, such tying is achieved by hard coding machine properties into the black box 22 and authenticating such machine properties at run time. The black box 22 is also entrusted to cryptographically authenticate other software components, typically by verifying proffered digital signatures, and thus can ensure that other components of the trusted system 18 on the user's computing device 14 and that proffered items such as licenses 16 have not been tampered with.

Typically, each black box 22 is accompanied by a digital black box certificate 24z (FIG. 1A) bearing (PU-BB), a unique ID, a version number, and perhaps other certificate contents. The black box certificate 24z is thus tied to the black box 22 through the correspondence of (PU-BB) and (PR-BB).

An issuer of a license 16 can decide to accept or reject a request for a license 16 from the trusted component 18 based on the certificate of the black box 22 thereof and the contents therein. In the event that a request is rejected, a newer black box 22 typically must be installed before the request is accepted. Of course, a new black box 22 may be installed for other reasons, may be initially installed separate from the installation of the remainder of the trusted component 18, may be installed with the remainder of the trusted component but not activated, etc.

As with other digital certificates, the black box certificate 24z is signed by a private key of an issuing entity (PR-ISSUER) based on a hash of at least a portion of the contents of the black box certificate 24z, and verifies by application of the corresponding public key (PU-ISSUER). If the contents are altered, the signature will not verify. Typically, the black box certificate 24z as issued by the issuer includes a chain 26 of certificates 24 leading back to a root certificate 24a from a trusted root authority, where each certificate in the chain 26 includes a public key that can be employed to verify the signature of the next certificate down the chain, and where the black box 22/trusted component 18 has knowledge of the public key of the root certificate 24 a. Thus, to verify the black box certificate 24z, the black box 22/trusted component 18 first verifies each certificate in the chain 26 from the root certificate 24a down to the black box certificate 24z. In addition, if any further certificate is issued based on the black box certificate 24z, i.e., is signed by (PR-BB), such further certificate can be verified by continuing the process down the chain to such further certificate.

More generally, it is to be appreciated that in addition to the black box certificate 24z, other certificates exist within the realm of the DRM system 10, where each certificate acts as a proffer that the corresponding element is authentic and trustworthy, holds a key, holds information relevant to the corresponding element, and/or the like. For example, an application to render content 12 may be accompanied by an application certificate 24aa and an accompanying chain 26 of certificates leading back to a trusted root authority recognized by the black box 22/trusted component 18. Likewise, a user participating in the DRM system 10 may be represented therein by a user certificate 24bb and an accompanying chain 26 of certificates leading back to a trusted root authority. Notably, a license 16 is a form of a certificate. Hence, as illustrated in the Figures, certificate 24 may represent a black box certificate 24z, a root certificate 24a, an issuer certificate 24x, or any other certificate in that chain (certificate a-x) an application certificate 24aa, user certificate 24bb, O/S certificate 24cc, computer certificate 24dd, license certificate 24ee, hardware certificate 24ff or any other suitable certificate.

Similarly, the computing device 14 may have a computing device certificate 24dd and accompanying chain 26, and various of the hardware elements (the hard drive, the processor, the video card, etc.) and software elements (the BIOS, the operating system, the graphics sub-system, etc.) within the computing device may each have a certificate 24ff and accompanying chain 26. Moreover, inasmuch as each license 16 is issued by an issuing entity and is signed, such license 16 is in a form of certificate 24ee and indeed has an accompanying chain 26 for purposes of verifying the signature thereof.

Typically, an entity that issues a particular certificate 24 has the power to revoke same by for example listing the public key associated with the certificate in an accessible revocation list. Thus, the black box 22/trusted component 18 in verifying any particular certificate 24 to authenticate the corresponding element may obtain from the issuer thereof a corresponding revocation list and review same to determine whether the certificate 24 is revoked, and if so may refuse to honor the certificate 24 and render rights-protected content 12 based on such revoked certificate 24. However, it is to be appreciated that when verifying/authenticating many certificates 24/elements from multiple issuers, as is the case with regard to the multiple chains 26 of certificates 24 seen in FIG. 1A, obtaining and reviewing revocation lists from all the issuers can quickly become cumbersome if not oppressive.

Accordingly, a need exists for a system and method to allow a trusted component 18, a black box 22, or any other inquiring entity to efficiently obtain and review such revocation lists in the course of authenticating and verifying certificates 24.

SUMMARY OF THE INVENTION

The aforementioned needs are satisfied at least in part by the present invention in which a digital certificate for authenticating a corresponding element is provided. The certificate is issued by an issuer for being verified by a trusted component of a computing device to authenticate the element, where the verification includes ensuring that the certificate is not revoked. The certificate has an identification of an entity as having authority over the certificate to revoke same as delegated by the issuer, where the delegated revocation authority revokes the certificate by identifying same in a revocation list. The certificate also has at least one revocation condition relating to possible revocation of the certificate, where each revocation condition has to be satisfied when the certificate is employed to authenticate the element.

To authenticate the certificate, the identification of the delegated revocation authority, a location from which the revocation list is to be obtained, and any freshness requirement to be applied to the revocation list are determined from the certificate. It is then ensured that the revocation list from the location is present and that the present revocation list satisfies the freshness requirement, that the present revocation list is promulgated by the delegated revocation authority identified in the certificate, and that the certificate is not identified in the present revocation list as being revoked.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
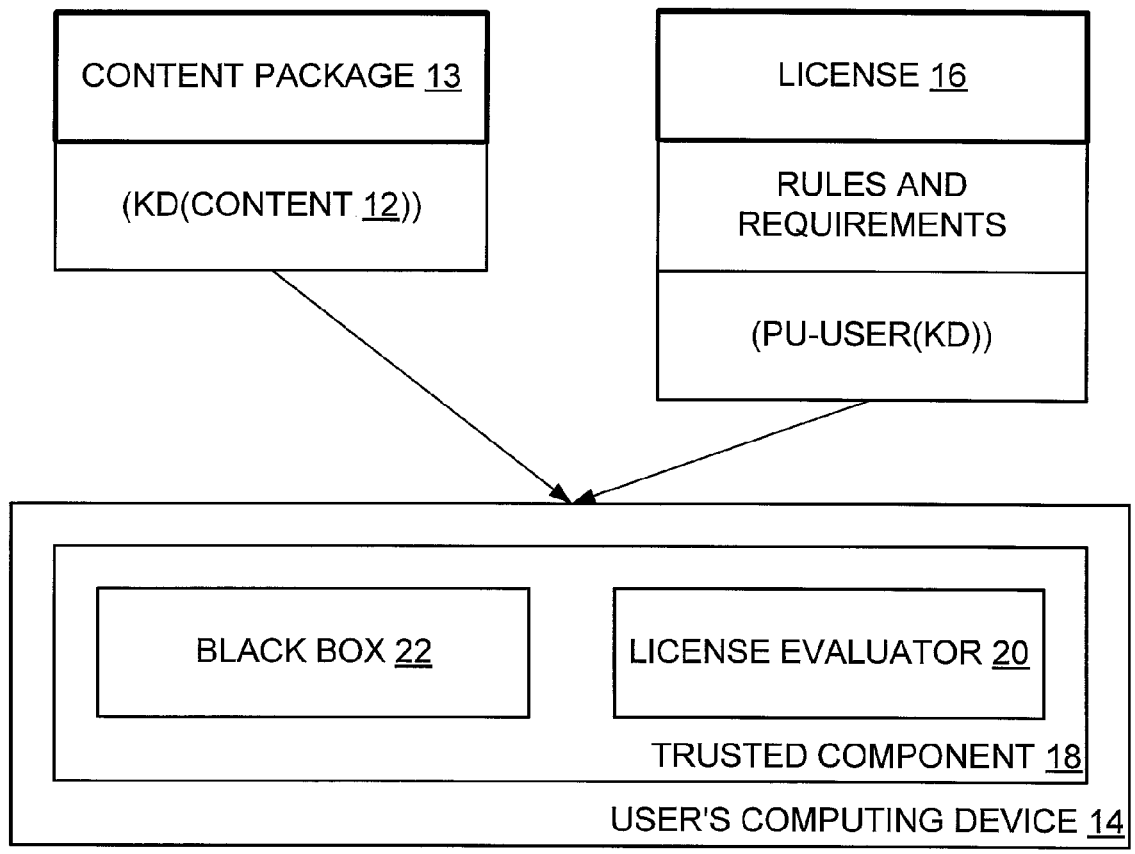
FIG. 1 is a block diagram showing an enforcement architecture of an example of a trust-based system.
Figure 1A:
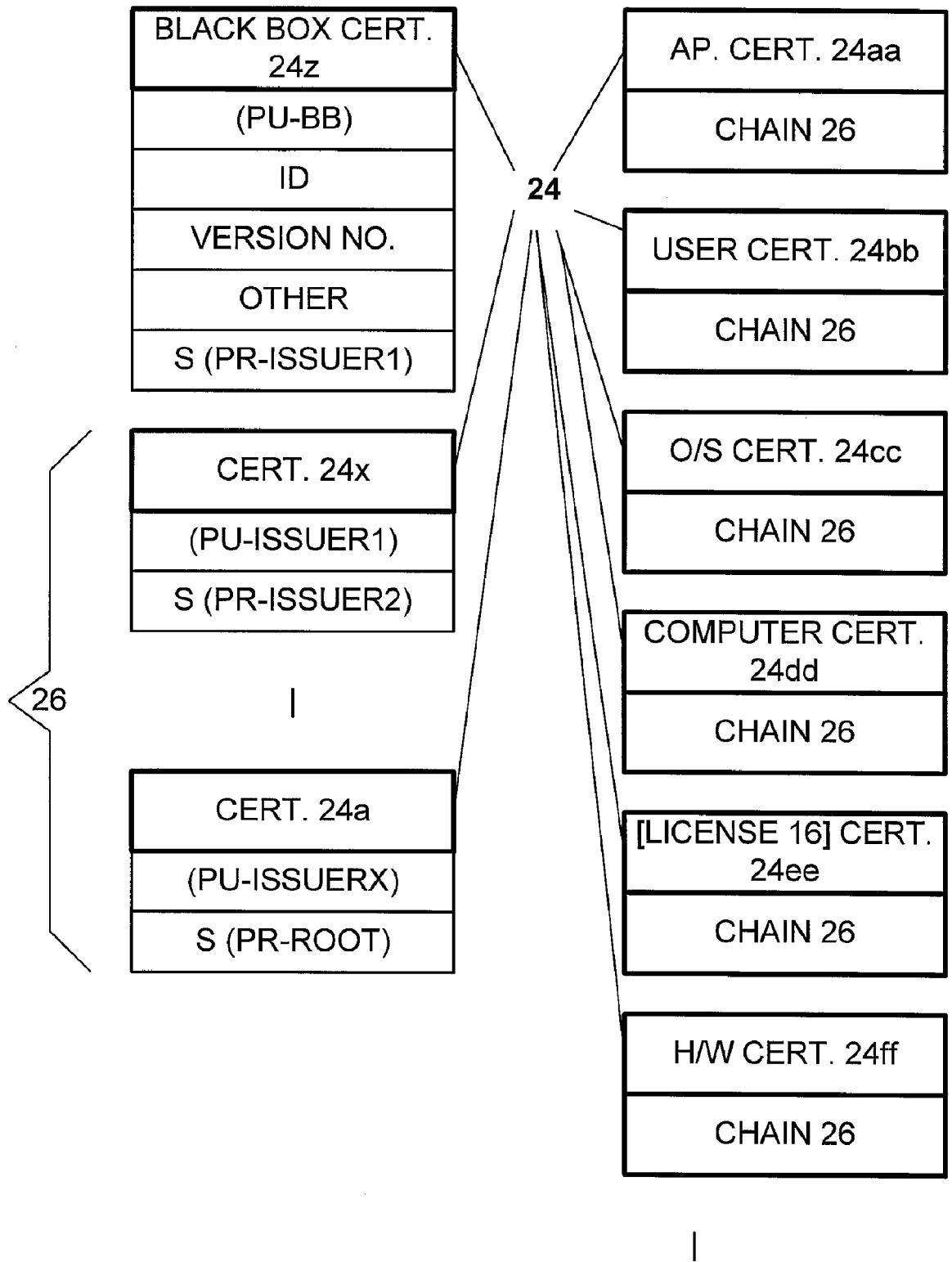
FIG. 1A is a block diagram showing multiple chained digital certificates as may be employed in connection with the architecture of FIG. 1.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
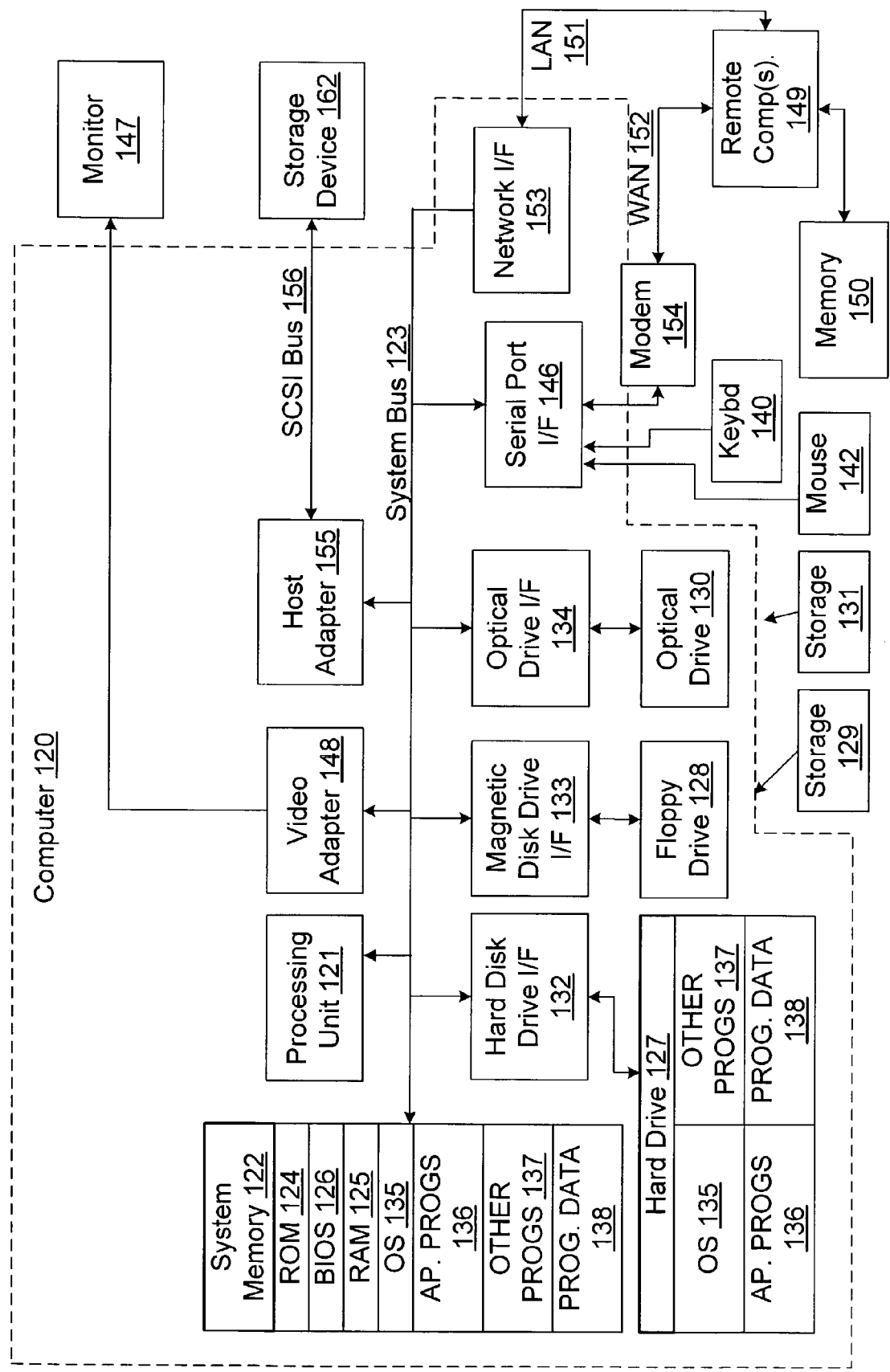
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Certificate Revocation

As was set forth above, in a DRM system 10, a trusted component 18/black box 22/other element (hereinafter 'trusted component 18') performs cryptographic functions including verifying certificates 24 and chains thereof 26 that are associated with various entities to authenticate the entities, including ensuring that each verified certificate 24 is not revoked or otherwise untrustworthy with respect to rendering rights-protected content 12. A certificate 24 is revoked through the creation, distribution, and enforcement of a corresponding signed revocation list that lists such certificate 24. Such signed revocation list is forwarded to the trusted component 18 and referred to thereby when verifying the certificate 24. Upon determining by way of a revocation list that a certificate 24 has been revoked, the trusted component 18 will not employ the revoked certificate 24 to perform any operation, provided that the revocation list was issued by an entity that has the right to revoke that certificate 24.

In the prior art, a certificate 24 could only be revoked by the entity that issued same. An example of a prior art certificate revocation system is set forth in U.S. Pat. No. 5,699,431, issued Dec. 16, 1997 and incorporated by reference in its entirety. In one embodiment of the present invention, the DRM system 10 defaults to such behavior. That is, a revocation list can only revoke a certificate 24 if the revocation list is issued by and signed by the issuer of the certificate 24. Since the issuer is identifiable by its public key (PU-ISSUER), both the revocation list and the revoked certificate 24 would have to be issued by (PU-ISSUER) and signed by the corresponding private key (PR-ISSUER).

Figure 3:
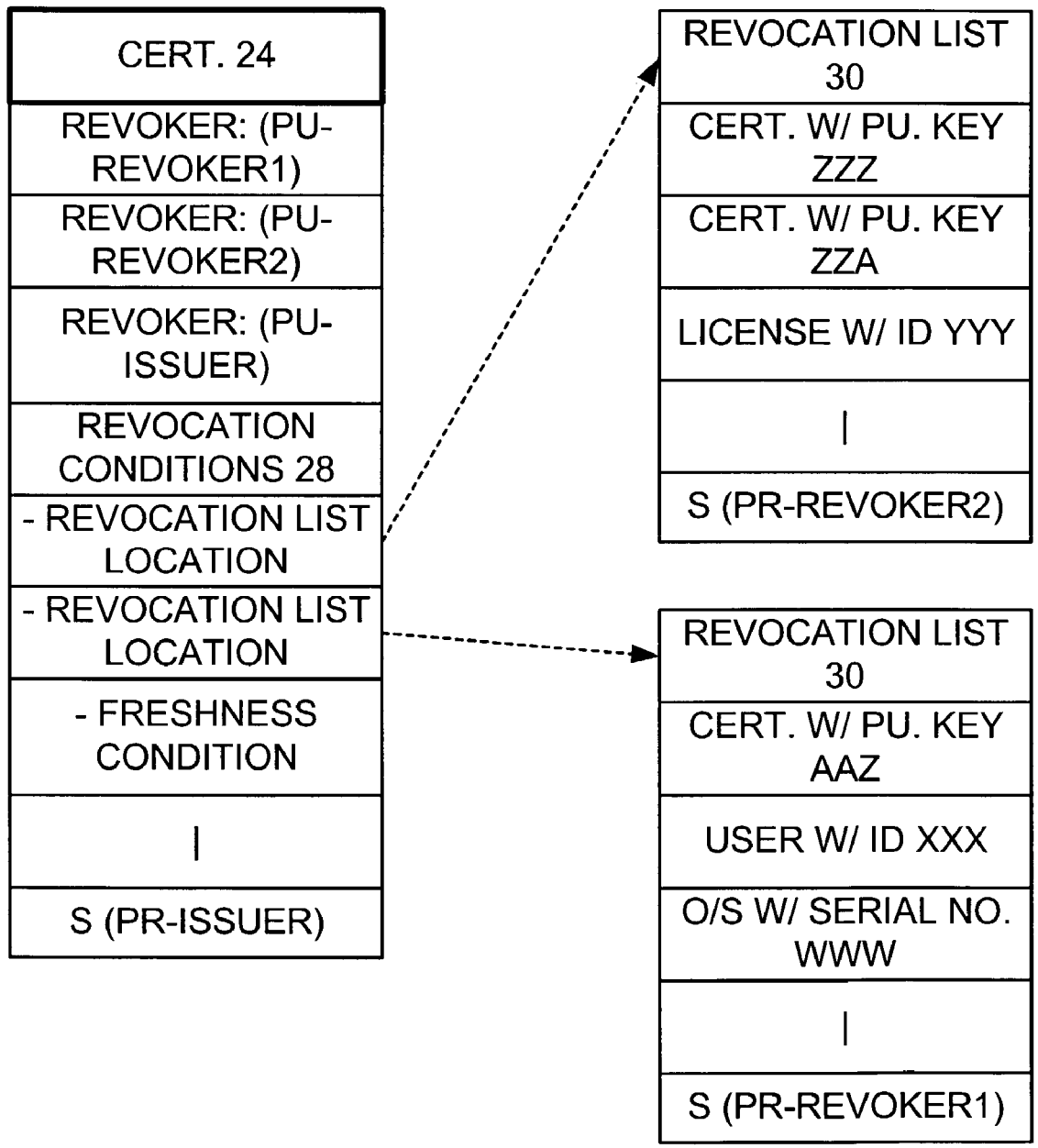
FIG. 3 is a block diagram of a digital certificate and revocation lists such as may be employed in one embodiment of the present invention.

In addition to such default behavior, and turning now to FIG. 3. in one embodiment of the present invention, a certificate 24 can explicitly name a public key of one or more revoking entities (PU-REVOKER1, PU-REVOKER2, PU-ISSUER in FIG. 3) that is/are permitted to revoke same. Here, authority to revoke the certificate 24 is delegated by the issuer to each named revoking entity. Note that by delegating such authority, the issuer may or may not reserve the authority to revoke the certificate 14 itself. Only a revocation list that is issued by a named revoking entity (PU-REVOKER1, PU-REVOKER2, or PU-ISSUER) and signed by the corresponding private key (PR-REVOKER1, PR-REVOKER2, PR-ISSUER) can revoke such certificate 24, unless the certificate 24 names no revoking entity and thus by default honors a revocation list issued by the issuer under (PU-ISSUER).

Moreover, aside from specifying one or more revoking entities, in one embodiment of the present invention a certificate 24 can also specify revocation conditions 28 that must be satisfied whenever the certificate 24 is used. As the revocation conditions 28 form a part of the certificate 24, the conditions 28 are established as policy that a trusted DRM component 18 is required to enforce. As may be appreciated, such revocation conditions 28 specify, among other things, a location from which a revocation list 30 can be downloaded from each revoking entity, and a freshness condition that indicates the maximum age a revocation list 30 can reach before a new copy must be downloaded. When a certificate 24 that specifies revocation conditions 28 is being employed by the trusted component 18 on a user's computing device 14 in connection with a request to render content 12, a revocation list 30 that fulfills the condition 28 must be acquired. If the revocation list 30 has not been acquired or such list 30 does not meet the requirements set forth in the condition 28, the certificate 24 cannot be employed to satisfy the request.

As may now be appreciated, because a certificate 24 can be written to delegate revocation authority to a specified key (PU-REVOKER), a publisher of content 12 issuing a corresponding license 16 can use a revocation list 30 in connection with such license 16 to define non-trustworthy certificates 24 that are not to be used in connection with rendering such content 12. Thus, and in one embodiment of the present invention, a revocation list 30 in connection with a particular certificate 24, either from the issuer of the particular certificate 24 or from a delegated revocation authority, can name any other certificate 24 that is not to be honored (i.e., is to be excluded from use) at least within the scope of employing the particular certificate 24.

To summarize, then, in the present invention, a particular certificate 24 as issued by an issuer can be written to be revocable by the issuer itself only, by one or more delegated revocation authorities only, or by the issuer itself or one or more delegated revocation authorities. Thus, such a certificate 24 can conceivably be revoked by being listed on a revocation list 30 from the issuer of the particular certificate 24 or by being listed on a revocation list 30 from a delegated revocation authority as identified within the particular certificate 24.

Correspondingly, if the revocation list 30 for the particular certificate 24, either from the issuer or from the delegated revocation authority, lists any other certificate 24, such other certificate 24 is excluded from use in connection with the particular certificate 24. However, the other, excluded certificate 24 is not revoked inasmuch as only the issuer of the excluded certificate 24 or the delegated revocation authority thereof can actually revoke such excluded certificate 24. Note that revocation and exclusion applies not only to main or end-entity certificates 24 such as those corresponding to a user, an element, a piece of content 12, a license 16, etc., but also to any certificate 24 within the chain 26 of certificates 24 accompanying any of the aforementioned main certificates 24. Finally, note that revocation and exclusion is enforced by the trusted component 18 on the user's computing device 14, which is trusted to do so by the issuer.

A portion of a certificate 24 that is only revocable by a delegated revocation authority is set forth below:

```
<BODY>
    <ISSUER>
        <PUBLICKEY>
            <ALGORITHM>RSA</ALGORITHM>
            <PARAMETER name="public-exponent">
                <VALUE encoding="integer32">65537</VALUE>
            </PARAMETER>
            <PARAMETER name="modulus">
                <VALUE encoding="base64" size="1024">91p . . .
                </VALUE>
            </PARAMETER>
        </PUBLICKEY>
    </ISSUER>
    <CONDITIONLIST>
        <REFRESH>
            <DISTRIBUTIONPOINT>
                <OBJECT type="Revocation">
                </OBJECT>
                <PUBLICKEY>
                    <ALGORITHM>RSA</ALGORITHM>
                    <PARAMETER name="public-exponent">
                        <VALUE encoding="integer32">65537>
                        </VALUE>
                    </PARAMETER>
                    <PARAMETER name="modulus">
                        <VALUE encoding="base64"
                        size="1024">25q . .
                        </VALUE>
                    </PARAMETER>
                </PUBLICKEY>
            </DISTRIBUTIONPOINT>
            <INTERVALTIME/>
        </REFRESH>
    </CONDITIONLIST>
</BODY>
```

As may be appreciated, such certificate 24 can only be revoked by the public key set forth in connection with the REFRESH condition in the condition list 28, which is not the public key of the ISSUER and therefore belongs to a delegated revocation authority. Also, the empty INTERVALTIME condition specifies that no revocation list 30 is required here. In fact, the certificate 24 does not provide a location from which a revocation list 30 must be obtained in connection therewith. The REFRESH condition merely indicates what entity can revoke the certificate 24, but does not actually require a revocation list 30 be retrieved from the entity by the trusted component 18 in order to consider the certificate 24. However, if a revocation list 30 is required by some other certificate 24, such revocation list 30 can revoke the above certificate 24 if signed by the private key that corresponds to the public key named in the REFRESH condition.

A certificate 24 can also be revocable by multiple delegated revocation authorities, as shown below.

```
<BODY>
    <ISSUER>
        <PUBLICKEY>
            <VALUE>
                AAA
            </VALUE>
        </PUBLICKEY>
    </ISSUER>
    <CONDITIONLIST>
        <REFRESH>
            <OBJECT type="Revocation">
            </OBJECT>
            <DISTRIBUTIONPOINT>
                <PUBLICKEY>
                    <VALUE>
                        AAA
                    </VALUE>
                </PUBLICKEY>
            </DISTRIBUTIONPOINT>
            <DISTRIBUTIONPOINT>
                <PUBLICKEY>
                    <VALUE>
                        BBB
                    </VALUE>
                </PUBLICKEY>
            </DISTRIBUTIONPOINT>
            <INTERVALTIME/>
        </REFRESH>
    </CONDITIONLIST>
</BODY>
```

As may be appreciated, non-noteworthy portions of the certificate 24 have been removed or compressed. Here, both the issuer with public key AAA and a delegated revocation authority with public key BBB can revoke this certificate 24. As should now be appreciated, a certificate 24 can be made irrevocable merely by not listing any public key in a REFRESH revocation condition.

The certificate 24 below requires a revocation list 30 obtained from a particular location ("http://server/revocation_list.xml") where the list 30 is signed by an owner of a particular public key, and where the list is less than 14 days old:

```
<CONDITIONLIST>
    <REFRESH>
        <DISTRIBUTIONPOINT>
            <OBJECT type="Revocation">
                <ADDRESS
                type="url">"http://server/revocation_list.xml"
                </ADDRESS>
            </OBJECT>
            <PUBLICKEY>
                <VALUE encoding="base64"
                size="1024">ugi . .
                </VALUE>
            </PUBLICKEY>
        </DISTRIBUTIONPOINT>
        <INTERVALTIME days="14" />
    </REFRESH>
</CONDITIONLIST>
```

An example of a revocation list 30 is as follows:

```
<?xml version="1.0"?>
<RevocationList>
    <BODY>
```

-continued

```
    <ISSUEDTIME>2001-11-01T08:07</ISSUEDTIME>
    <DESCRIPTOR>
        <OBJECT type="Revocation-List">
        </OBJECT>
    </DESCRIPTOR>
    <ISSUER>
        <OBJECT type="Corporation">
            <NAME>ABC Corporation</NAME>
            <ADDRESS type="URL">abct.com</ADDRESS>
        </OBJECT>
        <PUBLICKEY>
            <VALUE> CCC </VALUE>
        </PUBLICKEY>
    </ISSUER>
    <REVOCATIONLIST>
        <!-- revoke a principal by key -->
        <REVOKE category="principal" type="principal-key">
            <PUBLICKEY>
                <VALUE>DDD</VALUE>
            </PUBLICKEY>
        </REVOKE>
        <!-- revoke a license by id -->
        <REVOKE category="license" type="license-id">
            <OBJECT>
                <GUID>EEE</GUID>
            </OBJECT>
        </REVOKE>
        <!-- revoke a license by hash -->
        <REVOKE category="license" type="license-hash">
            <HASH>FFF</HASH>
        </REVOKE>
        <!-- revoke a license by issuer public key -->
        <REVOKE category="license" type="issuer-key">
            <PUBLICKEY>
                <VALUE>GGG</VALUE>
            </PUBLICKEY>
        </REVOKE>
        <!-- revoke by issuer id -->
        <REVOKE category="license" type="issuer-id">
            <ID>HHH</ID>
        </REVOKE>
        <!-- revoke content by content-id -->
        <REVOKE category="content" type="content-id">
            <ID>III</ID>
        </REVOKE>
        <!-- revoke a user by email address -->
        <REVOKE category="user" type="email">
            <EMAIL>"someuser@hotmail.com</EMAIL>"
        </OBJECT>
        </REVOKE>
    </REVOCATIONLIST>
</BODY>
<SIGNATURE>
...
</SIGNATURE>
</RevocationList>
```

Note that the revocation list 30 may be embedded within a certificate 24 such as a license 16 or another document from the issuer, although such revocation list 30 may also be issued separately. If so embedded, it may be the case that the license 16 was requested by a user and the embedded revocation list 30 was added on and was not specifically requested. Nevertheless, a revocation list 30 can be specifically requested without departing from the spirit and scope of the present invention.

The ISSUEDTIME of the revocation list 30 or in this case the license 16 within which the revocation list 30 is found is compared against the current system time in order to determine freshness. The ISSUER of the revocation list 30 is the entity performing the revocation. The revocation list 30 can only be used to revoke certificates 24 that the ISSUER is permitted to revoke. Each REVOKE structure names a certificate 24 or other item that is to be revoked by category, type and identifying criterion. Each REVOKE structure contains the information that identifies what is specifically being revoked, such as for example the public key DDD, the license 16 with GUID EEE, the license 16 with hash FFF, any license issued by an issuer having public key GGG or an issuer ID HHH, content with a content ID III, a user with a particular email address, etc.

As should now be appreciated, items that may be excluded by being specified in a revocation list 30 are not limited merely to certificates 24, and are not identifiable only by way of a public key. Instead, such items in a revocation list 30 can include any identifiable elements or 'principals' without departing from the spirit and scope of the present invention. Of course, and as should now be appreciated, only those principals that have been constructed to recognize the authority of the revocation list 30 may actually be revoked by the revocation list. All other principals are only excluded by appearing on the revocation list 30.

A given revocation list 30 should contain an ISSUEDTIME and should be signed by a private key. Also, to verify the signature on a revocation list 30, such list 30 should be accompanied by a certificate chain 26 leading back to a trusted root authority. As should now be appreciated, a list 30 has the power to revoke anything that is specifically named as revocable by the public key that corresponds to the private signing key that signed the certificate 24.

Figure 4:
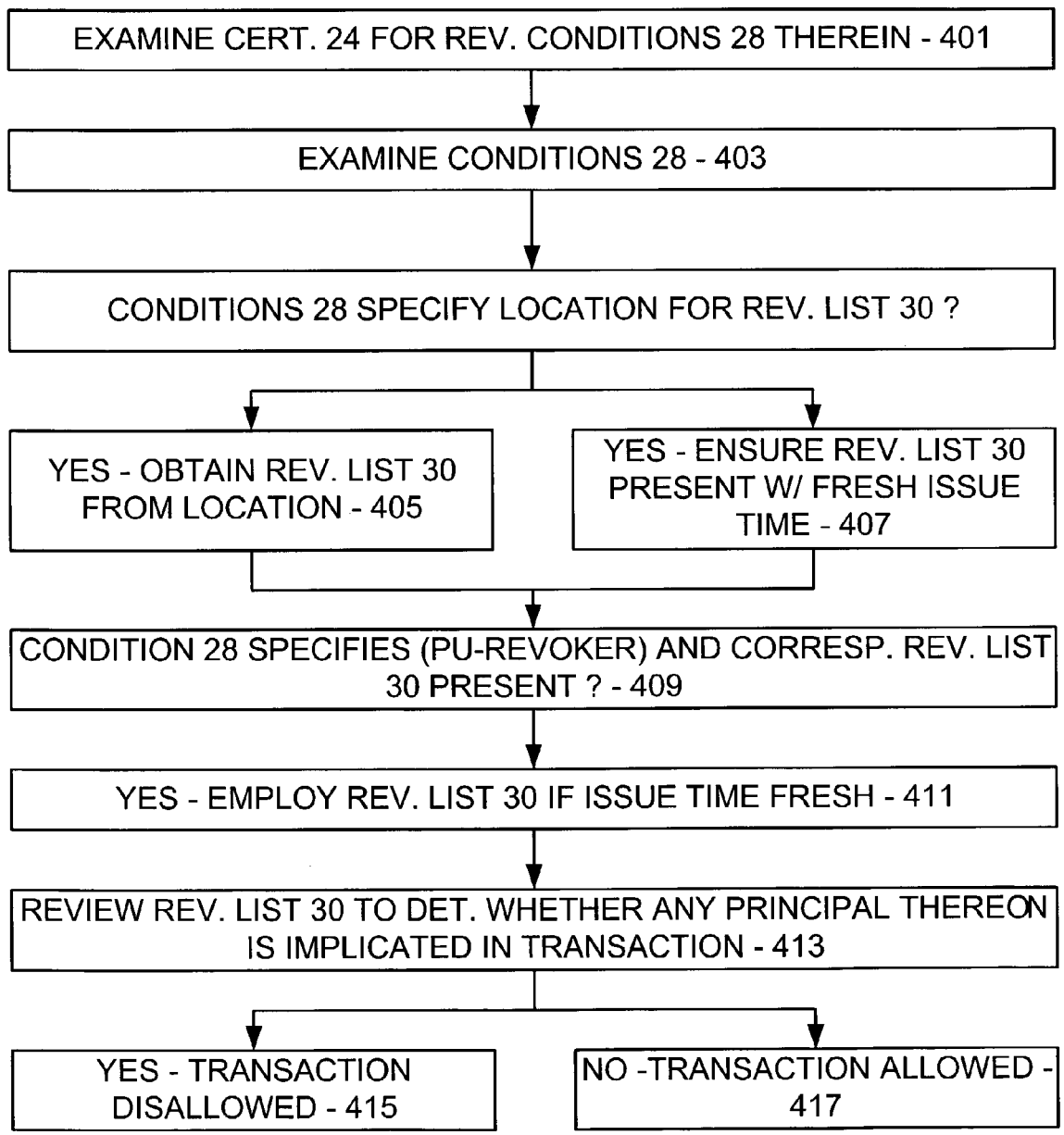
FIG. 4 is a flow diagram showing key steps performed in verifying the certificate of FIG. 3 with the revocation lists of FIG. 2 in accordance with one embodiment of the present invention.

To employ a certificate 24 in a transaction in one embodiment of the present invention, where the certificate 24 may have a revocation list 30 associated therewith, and turning now to FIG. 4, the certificate 24 is taken up and examined to determine whether any revocation conditions 28 exist therein (step 401). Presuming such conditions 28 do in fact exist therein, the conditions 28 are examined (step 403). For example, if one of the conditions 28 specifies a location from which a revocation list 30 is to be obtained, the revocation list 30 is in fact obtained from such location (step 405) or it is ensured that a revocation list 30 from such location is already present and that such present revocation list 30 has an issue time that satisfies any freshness condition specified in the revocation conditions 28 set forth in the certificate 24 (step 407).

Likewise, if one of the conditions 28 specifies a public key of a signer of a revocation list 30, a determination is made of whether a corresponding revocation list 30 is present (step 409), and if so such revocation list 30 is employed, presuming such revocation list 30 has an issue time that satisfies any freshness condition specified in the conditions 28 for the certificate 24 (step 411). Note that it may be the case that a condition 28 requires obtaining a particular revocation list 30 even though no corresponding condition 28 specifies a public key corresponding to such revocation list 30. Thus, the revocation list 30 is obtained but not employed in connection with the certificate 24 at issue. Correspondingly, it may be the case that a condition 28 specifies a public key corresponding to a revocation list 30 even though no corresponding condition 28 requires obtaining the particular revocation list 30. Thus, the revocation list 30 is not obtained but is employed in connection with the certificate 24 at issue if present.

Note that the transaction in connection with which the certificate 24 at issue is being employed may be any appropriate transaction without departing from the spirit and scope of the present invention. For example, the transaction may involve a request to render content 12, where the certificate 24 at issue is a license 16 corresponding to the content 12 or is in a chain 26 of certificates 24 accompanying the license. Likewise, the transaction may involve a request for a license 16, where the request includes receipt of the certificate 24 at issue from a licensor, either as an authentication of the licensor or as part of a chain of certificates 24 that accompany a certificate 24 that authenticates the licensor.

Note too that in connection with the transaction, other certificates 24 may come into play, such as certificates representing the user, the operating system of the computing device 14, the computing device 14 itself, etc., and chains 26 therefor. Moreover, as part of the transaction, it may be that the user uses a particular public key, that the machine has an ID, that the content 12 was signed by an owner of a particular public key, etc. As should be appreciated, although the revocation list 30 for the certificate 24 at issue can only revoke such certificate 24 at issue, the revocation list 30 may also exclude any other principal set forth in the revocation list 30 from the transaction. As should also be appreciated, whether a certificate 24 necessary for a transaction is revoked or whether any principal necessary for a transaction is excluded therefrom, the transaction is disallowed.

Thus, and still referring to FIG. 4, each revocation list 30 implicated by the certificate 24 is reviewed to determine whether any principal thereon is implicated in the transaction (step 413). If so, the transaction is not allowed to proceed by the trusted component 18 (step 415). If not, the transaction is allowed to proceed (step 417). Of course, even if a particular revocation list 30 for the certificate at issue allows the transaction to proceed, it may very well be the case that another revocation list 30 for the certificate at issue or for another certificate 24 prevents the transaction from proceeding. Accordingly, a transaction is allowed to proceed only after all revocation lists 30 for all certificates 24 are examined, and none of the examined revocation lists 30 disallows the transaction.

CONCLUSION

Although the present invention is especially useful in connection with a computing device 14 such as a personal computer or the like, the present invention may be practiced with regard to any appropriate device, all without departing from the spirit and scope of the present invention, such as for example a server, an intelligent appliance, a networked portable device, etc. Accordingly, the device 14 is to be interpreted to encompass any appropriate device that has a DRM system 10 or that participates in the DRM architecture.

The programming necessary to effectuate the, processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system and method to allow a trusted component 18, a black box 22, or any other inquiring entity to efficiently obtain and review revocation lists 30 in the course of authenticating and verifying certificates 24. It should be appreciated that changes could be made to the embodiments described above without departing from the inventive concepts thereof. For example, although the DRM system is described primarily in terms of rendering content 12, it is to be understood that the DRM system 10 is also applicable to any kind of accessing of content 12. It should be understood, therefore, that this invention is not limited to the particular embodiments disclosed, but it is intended to cover modifications within the spirit and scope of the present invention as defined by the appended claims.

The invention claimed is:

1. A computer-readable storage medium having instructions stored thereon that, when executed by a processor, perform a method of using a single digital certificate for authenticating a corresponding element in a digital rights management (DRM) system, the single certificate issued by an issuer for being verified by a trusted component of a user computing device to authenticate the element prior to access of digital content, the verification including ensuring that the single certificate is not revoked, the single certificate comprising:

an identification of at least two entities as having delegated authority over the single certificate to revoke same as delegated by the issuer, the issuer and the at least two entities being separate entities, the at least two entities being delegated revocation authorities, the delegated revocation authorities revoking the single certificate by identifying same in a separate revocation list for each of the delegated revocation authorities, locations of respective revocation lists internal to the single certificate; and at least one revocation condition internal to the single certificate relating to possible revocation of the single certificate, each revocation condition having to be satisfied when the single certificate is employed to authenticate the element of the digital rights management system, wherein upon authentication of the corresponding element, access to the digital content is granted to the user computing device.

2. The computer-readable storage medium of claim 1 wherein the identification of the delegated revocation authorities comprises a public key thereof, and wherein a revocation list from each of the delegated revocation authorities is digitally signed by a private key of each of the delegated revocation authorities corresponding to the public key thereof and is verifiable by such public key.

3. The computer-readable storage medium of claim 1 wherein the revocation condition specifies a location from which a revocation list must be obtained.

4. The computer-readable storage medium of claim 1 wherein the identification of the at least two entities having delegated revocation authority comprises a public key thereof, and wherein each revocation list from the location specified in the at least one revocation condition is from the respective delegated revocation authority, is digitally signed by a private key of the respective delegated revocation authority corresponding to the public key thereof, and is verifiable by such public key.

5. The computer-readable storage medium of claim 1 wherein the identification of the at least two entities having delegated revocation authority comprises a public key thereof, and wherein each revocation list from the location specified in the at least one revocation condition is not from the respective delegated revocation authority, is not digitally signed by a private key of the respective delegated revocation authority corresponding to the public key thereof, and is not verifiable by such public key.

6. The computer-readable storage medium of claim 1 wherein the at least one revocation condition specifies a freshness requirement regarding a respective revocation list, the freshness requirement stating a maximum age that the respective revocation list can reach before a fresher copy of the respective revocation list must be obtained.

7. The computer-readable storage medium of claim 1 in combination with a respective revocation list from a location specified in the at least one revocation condition, wherein the identification of the at least two entities having delegated revocation authority comprises a public key thereof, and wherein the respective revocation list is from the respective delegated revocation authority, is digitally signed by a private key of the respective delegated revocation authority corresponding to the public key thereof, and is verifiable by such public key.

8. The computer-readable storage medium of claim 7 wherein the respective revocation list specifies a non-trustworthy principal that is to be excluded in connection with using the certificate.

9. The computer-readable storage medium of claim 8 wherein the respective revocation list specifies a plurality of non-trustworthy principals that are to be excluded in connection with using the certificate.

10. The computer-readable storage medium of claim 8 wherein the excluded principal specified in the respective revocation list is another certificate.

11. The computer-readable storage medium of claim 8 wherein the excluded principal specified in the respective revocation list is selected from a group consisting of a public key, a user, an application, an operating system, a piece of hardware, a piece of software, a piece of content, and a digital license.

12. A method for authenticating a single digital certificate in a digital rights management (DRM) system for a corresponding element on a user computing device, the single certificate being issued by an issuer for being authenticated by a trusted component of the user computing device to authenticate the element prior to access to digital content, the method comprising:
   determining from the single certificate an identification of at least two entities as having delegated authority over the single certificate to revoke same as delegated by the issuer, the issuer and the at least two entities being separate entities, the at least two entities being delegated revocation authorities, the delegated revocation authorities revoking the single certificate by identifying same in a separate revocation list for each of the delegated revocation authorities;
   determining from the single certificate a location from which the revocation lists are to be obtained, the location of each of the revocation lists internal to the single certificate;
   determining from the single certificate a freshness requirement to be applied to the revocation lists, the freshness requirement internal to the single certificate;
   ensuring that the revocation lists from each of the locations is present and that the present revocation lists satisfy the freshness requirement;
   ensuring that the present revocations lists promulgated by the delegated revocation authorities identified in the single certificate; and
   ensuring that the single certificate is not identified in the present revocation lists as being revoked, wherein upon authenticating the single digital certificate in the DRM system, access to the digital content is granted to the user computing device.

13. The method of claim 12 wherein ensuring that the revocation lists are present and that the present revocation lists satisfy the freshness requirement comprises obtaining a revocation list from each of the locations.

14. The method of claim 12 wherein ensuring that the revocation lists are present and that the present revocation lists satisfy the freshness requirement comprises ensuring that the revocation lists from each of the locations is already present and that such present revocation lists have an issue time that satisfies the freshness requirement.

15. The method of claim 12 wherein the revocation lists are digitally signed by a private key of each of the delegated revocation authorities, the method signature comprising:
   determining from the certificate as the identification of the delegated revocation authorities a public key thereof corresponding to the private key thereof; and
   ensuring that the present revocation lists are promulgated by the delegated revocation authorities identified in the certificate by verifying the signature of the revocation lists with the public key of the delegated revocation authorities.

16. The method of claim 12 wherein the revocation lists specify a non-trustworthy principal, the method further comprising ensuring that the non-trustworthy principal is excluded in connection with using the certificate.

17. The method of claim 16 wherein the revocation lists specify a plurality of non-trustworthy principals, the method further comprising ensuring that each non-trustworthy principal is excluded in connection with using the certificate.

18. The method of claim 16 wherein the revocation lists specify a non-trustworthy principal that is another certificate, the method further comprising ensuring that the non-trustworthy another certificate is excluded in connection with using the certificate.

19. The method of claim 16 wherein the revocation lists specify a non-trustworthy principal that is selected from a group consisting of a public key, a user, an application, an operating system, a piece of hardware, a piece of software, a piece of, content, and a digital license another certificate, the method farther comprising ensuring that the non-trustworthy principal is excluded in connection with using the certificate.

20. The method of claim 12 comprising determining from the certificate an identification of the issuer as being the delegated revocation authority.

* * * * *